US006027598A

United States Patent [19]

Anderson

[11] Patent Number: 6,027,598

[45] Date of Patent: Feb. 22, 2000

[54] METHOD FOR PRODUCING AN EXPANDED CONTENT LABEL

[75] Inventor: Robert J. Anderson, Sioux Falls, S. Dak.

[73] Assignee: CCL Label, Inc., Sioux Falls, S. Dak.

[21] Appl. No.: 09/182,536

[22] Filed: Oct. 29, 1998

Related U.S. Application Data

[62] Division of application No. 08/708,482, Sep. 5, 1996, Pat. No. 5,860,238, which is a division of application No. 08/387,067, Feb. 13, 1995, Pat. No. 5,588,239.

[51] Int. Cl.$^{7}$ ..... B32B 31/00

[52] U.S. Cl. ..... 156/253; 156/257; 156/268; 156/269; 156/292; 40/310; 40/630; 283/81; 283/901; 283/103

[58] Field of Search ..... 283/103, 81, 101, 283/105, 109, 901, 56; 156/270, 269, 256, 253, 252, 292, 291, DIG. 9, 257, 268; 40/310, 628, 630, 626, 638

[56] References Cited

U.S. PATENT DOCUMENTS

| | | | |
|---|---|---|---|
| 1,974,401 | 9/1934 | Miller | 40/306 |
| 4,534,582 | 8/1985 | Howard | 283/81 |
| 4,592,572 | 6/1986 | Instance | 281/2 |
| 4,621,442 | 11/1986 | Mack | 40/638 |
| 4,711,686 | 12/1987 | Instance | 156/227 |
| 4,744,161 | 5/1988 | Instance | 40/638 |
| 4,744,591 | 5/1988 | Instance | 281/5 |
| 4,868,027 | 9/1989 | Hunkeler et al. | 428/42.3 |
| 5,403,636 | 4/1995 | Crum | 428/41.8 |
| 5,588,239 | 12/1996 | Anderson | 40/630 |

*Primary Examiner*—Richard Crispino
*Assistant Examiner*—Linda L. Gray
*Attorney, Agent, or Firm*—Warner Norcross & Judd LLP

[57] ABSTRACT

An expanded content label (ECL) having a segmented base label that allows the label to conform to a curved surface. A booklet and covering overlaminate are secured to the spaced-apart segments of the base to interconnect the segments. The gap between the segments enhances the ability of the label to flex and move along a supporting curved surface to conform to the surface without buckling or wrinkling. The label is produced by die cutting a web to form a segmented base label, securing a booklet to the segmented base label, and optionally securing an overlaminate to the booklet. At least one of the booklet and the overlaminate bridge the segments of the base label. In an alternative embodiment, the overlaminate is eliminated and the booklet includes a coversheet that extends across the gap between the base label segments.

11 Claims, 3 Drawing Sheets

METHOD FOR PRODUCING AN EXPANDED CONTENT LABEL

This is a divisional of application Ser. No. 08/708,482, filed Sep. 5, 1996, (U.S. Pat. No. 5,860,238), which is a divisional of application Ser. No. 08/387,067, filed Feb. 13, 1995 (now U.S. Pat. No. 5,588,239).

BACKGROUND OF THE INVENTION

The present invention relates to labels, and more particularly to expanded content labels and a method for producing the same.

Expanded content labels provide a simple and effective means for securing increased amounts of printed information to a product or its packaging. They are increasingly used to replace leaflets and other materials otherwise packaged with products.

A typical expanded content label (ECL) includes a booklet or leaflet that is either secured directly to the product or to a base label that is in turn secured to the product. The present invention is directed to the later "base label" construction. The booklet is pre-printed with information such as instructions, product warnings, or ingredients.

A challenge is presented when expanded content labels are applied to curved surfaces, such as bottles. An expanded content label has thickness, and consequently the layers have different radii of curvature when the label is mounted on a curved surface. Typically, the layers are intersecured in at least one of the longitudinal and lateral directions. Consequently, at least one of the layers will buckle or wrinkle when one attempts to mount the label on a bottle. This effect prevents the label from being smoothly secured to the bottle, presenting an unsightly and otherwise unacceptable situation. In addition, the strain on the booklet may cause the label to pop open or to peel away from the container.

To address this situation, expanded content labels have been manufactured with a "precurve" that enables the label to conform to the shape of a curved surface. Special equipment and techniques are required to form a precurve. As a result, a precurve label is relatively difficult to manufacture. In addition, labels formed with a precurve are effectively limited to use on surfaces having a radius matching that of the precurve. Accordingly, a label must be carefully matched to a particular bottle diameter and is thereafter not well suited for a bottle having a different diameter. Further, a precurve label for a round bottle is not well suited for use on a flat surface.

SUMMARY OF THE INVENTION

The aforementioned problems are overcome by the present invention wherein an expanded content label includes a segmented, or multi-piece, base label which allows the entire label to conform to a curved surface. The gaps between the base label segments permit the label to more effectively move and flex about the curved surface. The present invention also includes a method for manufacturing such a label.

The expanded content label of the present invention includes a booklet or leaflet secured to a base label. The base label includes two or more spaced-apart segments or portions that are interconnected by either or both of the booklet and an overlaminate. The booklet is sandwiched between the overlaminate and the base label. When the label is applied to a curved surface, the gap between the base label segments, in essence providing nonadhesive areas, allows the label to conform to the surface without buckling or wrinkling.

The present invention also includes the method for manufacturing the label. The method includes the steps of (1) die cutting a pressure-sensitive web on a release liner to form a succession of segmented base labels each having spaced apart portions, (2) securing a booklet to at least one of the portions of each segmented base label, and (3) applying an overlaminate over the booklet and all portions of the base labels to intersecure the base label portions and to provide a unitary expanded content label. In an alternative embodiment, the overlaminate is eliminated and the booklet coversheet includes an extended portion that bridges the gap between the base label segments.

The present invention provides a simple and inexpensive expanded content label that readily conforms to a wide range of surface contours. The need to precurve the label is eliminated. In addition, a single label may be applied to a variety of curved surfaces, or even a flat surface, eliminating the need to manufacture different labels for differently curved surfaces.

These and other objects, advantages, and features of the invention will be more readily understood and appreciated by reference to the detailed description of the preferred embodiment and the drawings.

DETAILED DESCRIPTION OF THE PREFERRED EMBODIMENT

I. Preferred Embodiment

Figure 1:
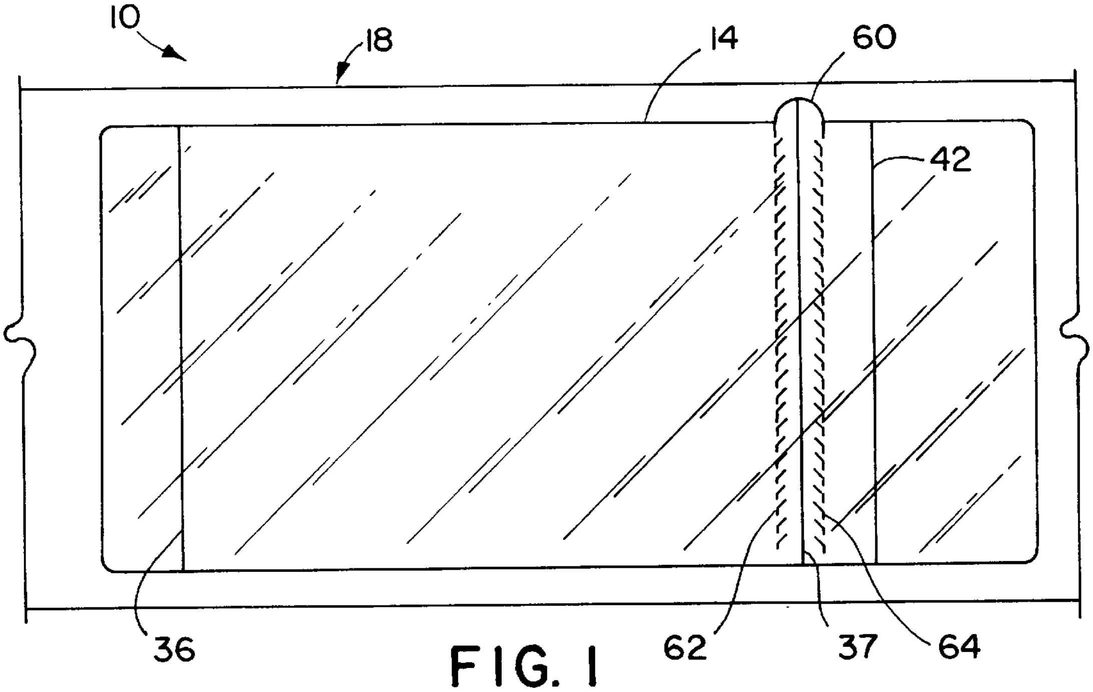
FIG. 1 is a top plan view of an expanded content label.
Figure 2:
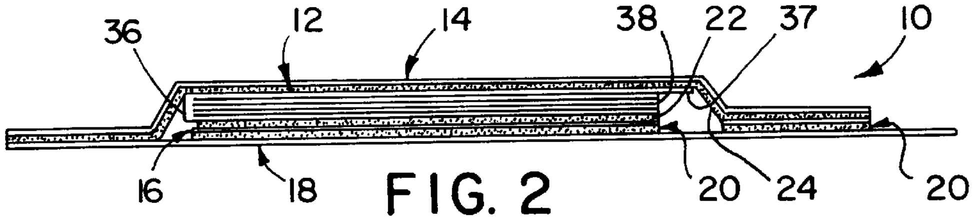
FIG. 2 is a side elevational view of the expanded content label.
Figure 3:
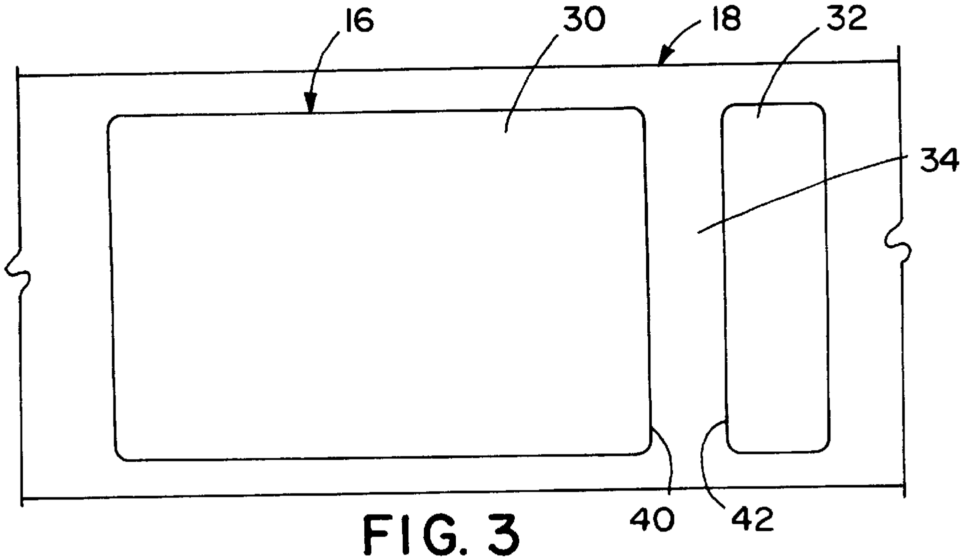
FIG. 3 is a top plan view of the segmented base label.

A preferred embodiment of the expanded content label (ECL) of the present invention is illustrated in FIGS. 1–3 and generally designated 10. The label includes a base label 16, a booklet 12 adhered to the base label, and a protective overlaminate 14 adhered to both the booklet and the base label. The base label includes two or more spaced apart segments and a pressure-sensitive adhesive 20 on its undersurface. The label is releasably mounted on a continuous release liner 18 for storage, transportation, and handling in label application machinery. When the ECL 10 is removed from the release liner 18, the pressure-sensitive adhesive 20 is exposed so that the label can be secured to an object. The gaps between the segments of the base label 16 allow the label to conform to curved surfaces without buckling or wrinkling. These nonadhesive areas can move along the surface.

As perhaps best illustrated in FIG. 3, base label 16 includes first and second segments, or portions, 30 and 32. The undersurface of each segment 30, 32 is coated with an adhesive layer 22 (see FIG. 2). As disclosed, the adhesive layer 22 covers the entire undersurface of each layer. Alternatively, the adhesive layer can be applied in a pattern so as not to cover the entire undersurface.

The first segment 30 receives booklet 12. As disclosed, the first segment 30 has a longitudinal length and transverse width generally the same as booklet 12. Alternatively, segment 30 may include a transverse marginal portion (not shown) that extends beyond the booklet 12 to support overlaminate 14 so that the transverse edges of the booklet 12 are sealed. Suitable materials and adhesives for the base label are generally well know to those have skill in the ECL art.

The second segment 32 is spaced apart from the first segment 30. As a result, a gap 34 is defined between inner edge 40 of segment 30 and inner edge 42 of segment 32. In addition, segments 30 and 32 preferably include rounded corners which reduce flagging and inadvertent peeling of the label. Both of segments 30 and 32 may or may not be pre-printed with product information. The number, size, and location of the segments for each base label will vary from application to application depending on the shape and design of the label as well as the contour of the surface to which it will likely be applied.

Booklet 12 is generally well known to those having skill in the ECL art and preferably includes a plurality of pre-printed pages that are bound together using conventional methods. The booklet is pre-printed with product ingredients, directions, installation instructions, product warnings, coupons, advertisements, and/or other information. In the preferred embodiment, booklet 12 has a width and a length generally the same as the width and length of the first segment 30 of base label 16 and includes longitudinally opposed bound and free edges 36 and 38, respectively. The free edge 38 of all booklet sheets other than the top sheet are generally aligned with one another and with inner edge 40 of segment 30. The free edge 37 of the top sheet extends longitudinally beyond the other sheets and over the gap 34 so that overlaminate 14 does not adhere directly to the other sheets. This facilitates removal of zipper tab 60 as described below. While the present invention is described in conjunction with a booklet, other constructions such as leaflets can be readily substituted therefor.

Referring now to FIGS. 1 and 2, overlaminate 14 provides the entire upper surface of the label 10 and includes a pressure-sensitive adhesive layer 24 on its undersurface. Overlaminate 14 adheres directly to release liner 18, booklet 12, and the second base label segment 32. Additionally, as described above, overlaminate 14 adheres to any extended lateral marginal portion (not shown) of segment 30. In the preferred embodiment, overlaminate 14 is a transparent material which allows viewing of material printed on the upper surface of booklet 12 and second segment 32. Suitable materials and adhesives for the overlaminate 14 are well known to those having ordinary skill in the ECL art.

Overlaminate 14 includes a zipper tab 60 that may be stripped away from label 10 to provide access to booklet 12. The zipper tab 60 includes a pair of spaced apart perforations 62, 64 that are broken as overlaminate 14 is removed. In the preferred embodiment, perforation 64 is formed directly over gap 34 and spaced from the second base label portion 32 so that overlaminate 14 fully covers the label portion and extends beyond the inner edge 42 of segment 32 after zipper tab 60 has been removed. As a result, overlaminate 14 protects inner edge 42 from inadvertent, or even intentional, flagging. Alternatively, the zipper tab 60 may be replaced by a single perforation that is opened to provide access to the booklet 12.

II. Method of Production and Application

A method for producing the expanded content label in accordance with a preferred embodiment of the present invention will now be described in connection with FIGS. 1–3. While it is possible to produce labels one at a time, the presently preferred method is to produce a plurality of labels on a continuous web of release material.

The method begins with a continuous web of pressure-sensitive base label stock adhered to a silicone-coated release liner. The web is typically purchased as a prefabricated assembly, however, it may be custom manufactured to allow patterning of adhesive layer 20. Patterned adhesive may allow the label to better conform to certain curved surfaces. For example, a narrow strip of adhesive may be used as a substitute for continuous coating to allow a large portion of the label to move freely when applied to a curved surface. Additionally, the adhesive may be applied in patterns only in those areas of what will become the base label segments.

Next, a pattern of adhesive 22 is applied to the upper surface of what will become the first segment 30 of each base label 16. Presently, a continuous coating coextensive with the eventual segments of the base label are used. However, the patterns may be altered as desired. For example, a narrow strip of adhesive may be used to allow a large portion of the booklet to move freely with respect to the base label 16, or adhesive may be conserved by applying a narrow strip just inside the periphery of the eventual segments 30 of the base label.

After adhesive layer 22 is applied, the label stock web is die cut using conventional methods and the offal, or waste matrix, is stripped away to form a succession of segmented base labels 16 on release liner 18 (See FIG. 2). In the preferred embodiment, the segmented base labels 16 each include segments 30 and 32.

Booklet 12 is aligned with and placed on the upper surface of segment 30. Adhesive layer 22 secures booklet 12 to the first base label segment 30.

Overlaminate 14 is applied directly over the web to adhere to release liner 18, booklet 12, and base label 16. As illustrated in FIG. 1, adhesive 24 on the undersurface of overlaminate 14 secures the overlaminate to the release liner and other label components.

The assembly is die cut through the overlaminate 14, booklet 12, and base label 16, and the waste is stripped away to form a succession of pressure-sensitive expanded content labels each having a segmented base label. This die-cutting step forms (1) the leading and trailing edges and the corners of the overlaminate and (2) the lateral edges of the overlaminate, the booklet, and optionally the base label. The perforations 62 and 64 are formed in the overlaminate of each label during this final die cutting step to create the zipper tabs 60.

The segmented base label facilitates application of the label to a curved surface, such as a bottle. The continuous web of ECL's is mounted on conventional label application machinery in conventional fashion. The web is moved in coordination with the articles to be labeled so that one label is presented to one article in timed sequence. The leading edge of the label lifts from the release liner and continues into engagement with bottle. The label continues to "roll" around the bottle due to relative rotational movement between the two. As the label "rolls," the gaps between the segmented portions of the base label permit the label to move against the bottle so that the label is more flexible in conforming to the bottle shape. Consequently, the label readily conforms to the curved surface without the need for precurve.

III. First Alternative Embodiment

Figure 4:
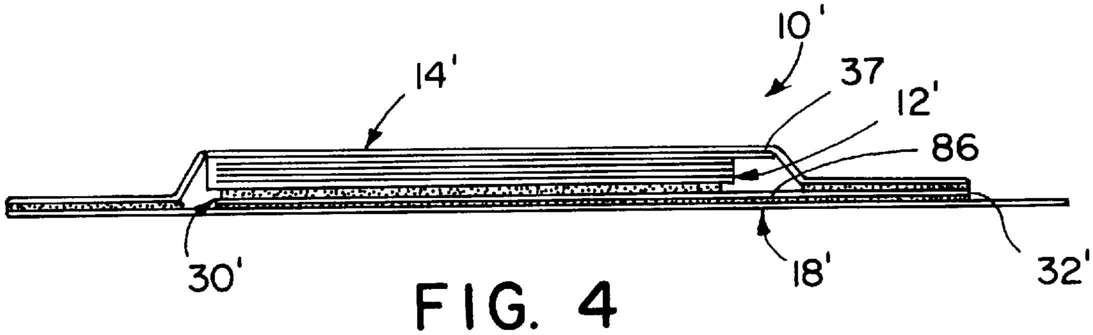
FIG. 4 is a side elevational view of an expanded content label according to a first alternative embodiment.
Figure 5:
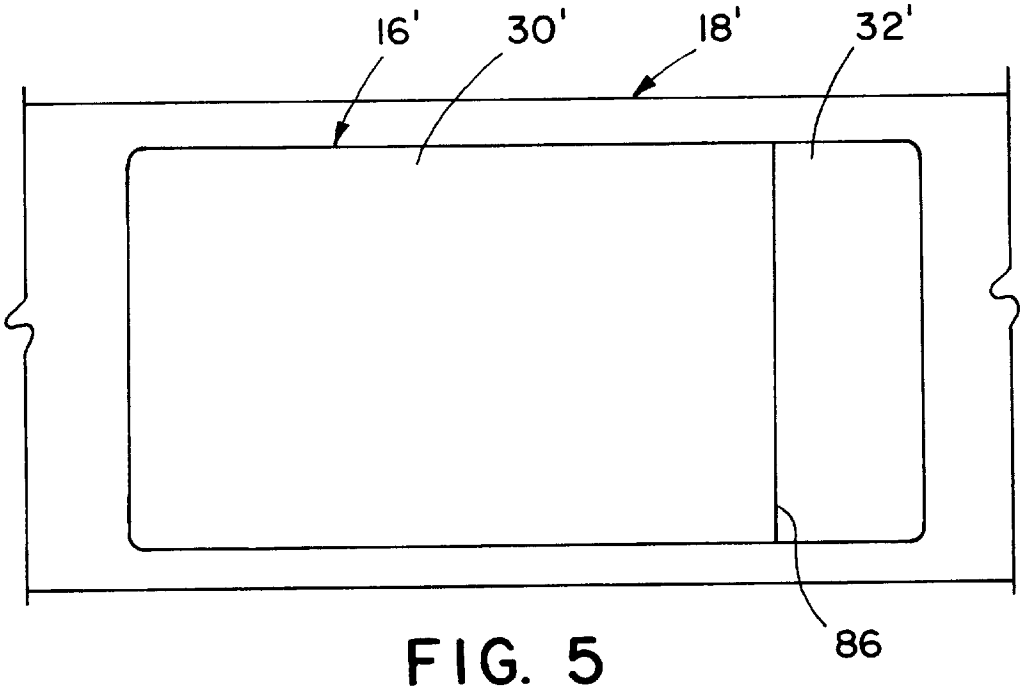
FIG. 5 is a top plan view of the segmented base label of the first alternative embodiment.

In a first alternative embodiment, gap 34 is eliminated and segments 30' and 32' are separated by a single cut 86 formed through the base label 16' (see FIGS. 4 and 5). The cut is created when the base label stock is die cut as described above. The cut 86 extends entirely across the label 10' to completely separate the base label segments. Alternatively, cut 86 may be broken to leave one or more bridges or ties that connect the segments of the base label. Any ties are severed during application to separate the segments of the base label. When the label is applied to a curved surface, segments 30' and 32' are free to overlap along cut 86 to prevent buckling or wrinkling of the label.

IV. Second Alternative Embodiment

Figure 6:
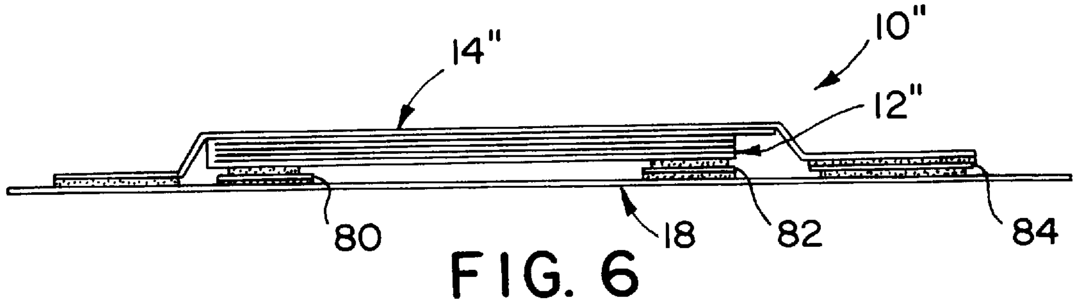
FIG. 6 is a side elevational view of an expanded content label according to a second alternative embodiment.
Figure 7:
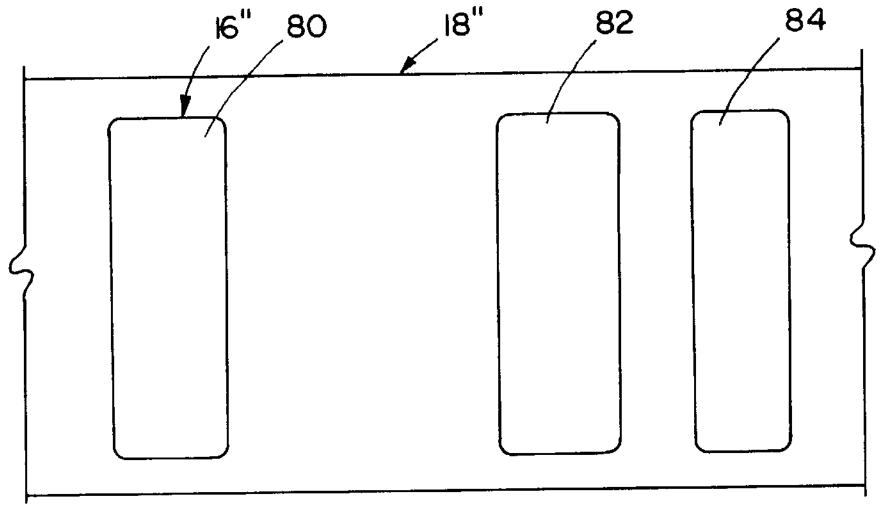
FIG. 7 is a top plan view of the segmented base label of the second alternative embodiment.

A second alternative embodiment of the present invention is illustrated in FIGS. 6 an 7. This embodiment includes three base label segments 80, 82, and 84. Booklet 12" is adhered to the upper surface of the segments 80 and 82 to bridge these two segments. The overlaminate 14" is adhered to and unites booklet 12" and base label segment 84. The increased number of segments enhances the ability of label 10" to adapt to curved surfaces because it provides additional portions where the label may shift freely during application.

V. Third Alternative Embodiment

Figure 8:
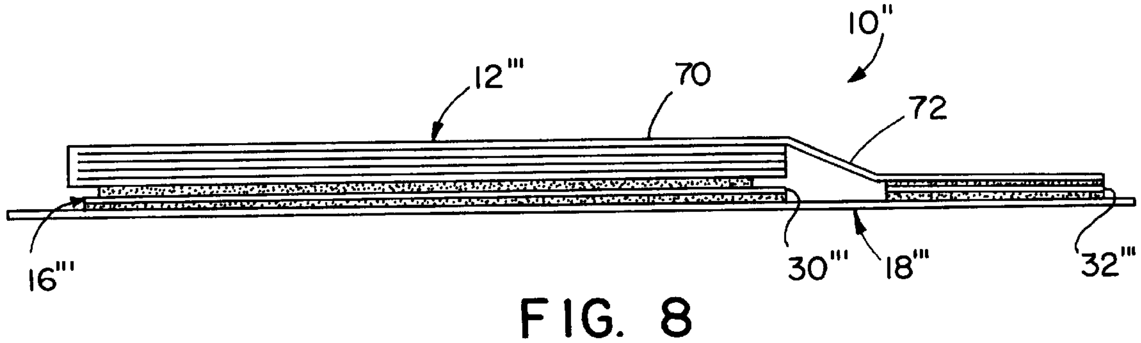
FIG. 8 is a side elevational view of an expanded content label according to a third alternative embodiment.

In yet another alternative embodiment, overlaminate 14 is eliminated and the cover sheet 70 of booklet 12'" is provided with an extended marginal portion 72 (see FIG. 8). The extended marginal portion 72 bridges the gap between segments 30'" and 32'" and adheres directly to the upper surface of segment 32'". In this embodiment, the zipper tab 60 or perforation is cut directly into cover sheet 70 of booklet 12'".

The above descriptions are those of preferred embodiments of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A method for producing expanded content labels comprising the steps of:

cutting a continuous web to form a plurality of base labels, each including unconnected first and second base label segments each having upper and lower surfaces, the continuous web including a release liner to support the plurality of base labels;

securing a booklet to the upper surface of at least one of the first and second base label segments; and securing an overlaminate to selected ones of the booklet and the first and second base label segments so that all of the expanded content label elements are intersecured.

2. The method of claim 1 wherein the base label segments are spaced apart to define a gap therebetween; and further comprising a second cutting step to cut a perforation in the overlaminate overlying the gap.

3. The method of claim 2 wherein said second cutting step includes spacing the perforation from the second base label segment.

4. A method for producing expanded content labels comprising the steps of:

providing a web of base label adhered to a release liner, the base label having upper and lower surfaces;

cutting the base label to form a plurality of base labels carried on the release liner, each said base label including a plurality of base label segments, each said segment having upper and lower surfaces;

securing a booklet to the upper surface of one of the base label segments in each of the base labels; and intersecuring the base label segments in each of the base labels.

5. The method of claim 4 further comprising the step of:

cutting each said booklet and base label together to align at least selected ones of their edges.

6. The method of claim 4 wherein said intersecuring step includes securing an overlaminate over each of the booklets and base labels.

7. The method of claim 4 wherein said intersecuring step includes securing each said booklet to a second of the base label segments of the associated base label.

8. The method of claim 7 wherein each said booklet includes a front cover sheet having an extended marginal portion; and wherein said securing step includes securing the marginal portion of each said front cover sheet to the upper surface of another of the base label segments in each of the base labels.

9. A method for producing an expanded content label comprising the steps of:

providing a web of base label stock adhered to a release liner, the base label stock having upper and lower surfaces;

cutting the base label stock to form a base label carried on a release liner, said base label including a plurality of unconnected base label segments each having upper and lower surfaces;

providing a booklet that is separate and distinct from the base label segments; and securing the booklet to the upper surface of at least two of the base label segments in each of the base labels.

10. The method of claim 9 further comprising the step of:

securing an overlaminate to the booklet and at least one base label segment to intersecure all of the expanded content label elements.

11. The method of claim 9 wherein the booklet includes a rear sheet and a front cover sheet; and said securing step including securing the rear sheet to at least one of the base label segments and the front cover sheet to at least one other of the base label segments.

* * * * *